United States Patent [19]

Lühmann et al.

[11] Patent Number: 4,772,329

[45] Date of Patent: Sep. 20, 1988

[54] AQUEOUS DISPERSIONS BASED ON CELLULOSE NITRATES, A PROCESS FOR THEIR PRODUCTION AND THEIR USE AS QUICK-HARDENING COATINGS

[75] Inventors: Erhard Lühmann, Bomlitz; Lutz Hoppe; Klaus Szablikowski, both of Walsrode, all of Fed. Rep. of Germany

[73] Assignee: Bayer Aktiengesellschaft, Leverkusen, Fed. Rep. of Germany

[21] Appl. No.: 943,299

[22] Filed: Dec. 17, 1986

Related U.S. Application Data

[63] Continuation of Ser. No. 841,631, Mar. 19, 1986, abandoned, which is a continuation of Ser. No. 702,196, Feb. 15, 1985, abandoned.

[30] Foreign Application Priority Data

Mar. 3, 1984 [DE] Fed. Rep. of Germany ....... 3407932
Nov. 27, 1984 [DE] Fed. Rep. of Germany ....... 3443088

[51] Int. Cl.$^4$ ............................ C08L 1/08; C08L 1/18
[52] U.S. Cl. .................................... 106/170; 106/195; 524/32; 525/921; 527/314
[58] Field of Search ............... 106/195, 170; 527/314; 525/921; 524/32

[56] References Cited

U.S. PATENT DOCUMENTS

| | | | |
|---|---|---|---|
| 2,857,344 | 10/1958 | Walus | 523/508 |
| 3,615,792 | 10/1971 | Keene | 106/170 |
| 4,227,978 | 10/1980 | Barton | 204/159.12 |
| 4,308,119 | 12/1981 | Russell | 204/159.12 |
| 4,417,025 | 11/1983 | Toba et al. | 527/314 |
| 4,435,531 | 3/1984 | Nakayama et al. | 527/314 |
| 4,451,509 | 5/1984 | Frank et al. | 525/921 |

FOREIGN PATENT DOCUMENTS

| | | | |
|---|---|---|---|
| 2436614 | 2/1976 | Fed. Rep. of Germany. | |
| 686672 | 1/1953 | United Kingdom. | |
| 2090842 | 7/1982 | United Kingdom | 524/32 |

*Primary Examiner*—Theodore Morris
*Attorney, Agent, or Firm*—Sprung Horn Kramer & Woods

[57] ABSTRACT

Aqueous coating agent dispersions comprising
A. from 3 to 30% by weight of cellulose nitrate,
B. from 10 to 50% by weight of at least one liquid prepolymer, which is optionally emulsifiable in water even in the absence of emulsifier, which contains from 0.01 to 1.3 mols/100 g of prepolymer of polymerizable C—C double bonds,
C. from 0 to 25% by weight of at least one liquid prepolymer, which is not emulsifiable in water in the absence of emulsifier, which contains from 0.01 to 1.3 mols/100 g of prepolymer of polymerizable C—C double bonds and has a maximum acid value of 25 and a maximum viscosity at 23° C. of 60 Pa.s,
D. from 0 to 20% by weight of an organic solvent with an evaporation number of <20,
E. from 0 to 15% by weight of a plasticizer,
F. from 0 to 5% by weight of a conventional emulsifier,
G. from 0 to 10% by weight of further conventional additives, and
H. water as the remainder the total of A–H always being 100% by weight and if B=C, the quantity of emulsifier has to be >0.

12 Claims, No Drawings

AQUEOUS DISPERSIONS BASED ON CELLULOSE NITRATES, A PROCESS FOR THEIR PRODUCTION AND THEIR USE AS QUICK-HARDENING COATINGS

This is a continuation of application Ser. No. 841,631, filed Mar. 19, 1986, now abandoned.

It is known to produce aqueous coating agents based on cellulose nitrates and to use them as lacquers.

Thus, DOS No. 2 703 075 and DOS No. 2 702 986 discloses a process for the production of dispersions based on cellulose nitrates. In this process the lacquer components are dissolved in an excess quantity of organic solvents, emulsified in water and the organic solvent is subsequently completely or partially distilled off. In order to produce clear, high-gloss coatings from these dispersions, a sufficient quantity of coalescing agent has to be added to the dispersions so that the water can be separated as an azeotrope and so that there is a sufficient quantity of coalescing agent for the film forming of the solids particles.

Coalescing agents with an evaporation number of more than 33 (according to DIN No. 53 170) generally have to be used in a quantity of from 12 to 20% by weight with a solids content of from 25 to 30% by weight for the finished lacquer. These solvents which are difficult to evaporate mean that the lacquer can only be sufficiently hardened at a relatively high temperature and with relatively long drying times.

A further disadvantage resides in the chemical-resistance of the lacquer film not always being adequate.

In a further development of this state of the art, aqueous cellulose nitrate dispersions are described in DOS No. 3 100 756, which have a stability in storage of 24 h due to the simultaneous use of water-insoluble aminoplast resins even after the addition of acid, and yield films, free from cloudiness, which contain a relatively small quantity of coalescing agent. The hardening of the lacquer is also delayed, in this case, due to the evaporation numbers of these coalescing agents being >33.

There is thus a need for aqueous cellulose nitrate dispersions which can be processed to produce quick-hardening, high-gloss, chemical-resistant coatings, without not easily volatilized coalescing agents having to be added to these dispersions before their processing. The coatings should preferably also be resistant to yellowing so that they can also be used without difficulty on bright bases.

This is achieved according to the invention by the preparation of aqueous dispersions, consisting of A. from 3 to 30, preferably from 5 to 25% by weight, of cellulose nitrate, B. from 10 to 50, preferably from 15 to 45% by weight, of at least one liquid prepolymer, which is optionally emulsifiable in water even in the absence of an emulsifier, and contains from 0.01 to 1.3 mols/100 g of prepolymer of polymerisable C—C double bonds, C. from 0 to 25, preferably from 0 to 20% by weight, of at least one liquid prepolymer, which is not emulsifiable in water in the absence of emulsifier and contains from 0.01 to 1.3 mols/100 g of prepolymer of polymerisable C—C double bonds, has a maximum acid value of 25 and a maximum viscosity at 23° C. of 60 Pa.s, D. from 0 to 20% by weight of an organic solvent with an evaporation number of <20, E. from 0 to 15% by weight of a plasticiser, preferably an ethoxylated plasticiser, F. from 0 to 5% by weight of a conventional emulsifier, G. from 0 to 10% by weight of further conventional additives, and H. water as the remainder, the total of A—H always being 100% by weight and, if B=C, the quantity of emulsifier has to be >0.

This invention also relates to processes for the production of these aqueous coating dispersions, which are characterised in that the unsaturated prepolymer(s) and optionally the plasticiser are optionally dissolved in an organic solvent, the water-moist cellulose nitrate is worked in and a dispersion is obtained by addition of water, to which dispersion (photo) initiators have to be added before hardening.

According to a preferred embodiment for the production of the storage-stable aqueous coating dispersions of the oil-in-water type according to the invention, based on an organic phase which has been emulsified in water, cellulose nitrate, optionally a plasticiser, preferably an ethoxylated plasticiser, optionally an emulsifier and the unsaturated prepolymer(s) are dissolved in an organic solvent. The process is carried out in such a manner that a ratio of solids to organic solvent of more than 4:1 is fixed in the production of the organic phase and conventional quantities of water are added, preferably dropwise, to the organic phase, the temperature of which does not exceed at most 55° C., preferably at most 45° C.

Preferred aqueous dispersions consist of components A, B, D, E, F and H.

Dispersions which are particularly resistant to yellowing consist of components A, B, prepolymers which are emulsifiable in water in the absence of emulsifier being used, C, D, G and H and contain no plasticisers, particularly no ethoxylated plasticisers, and preferably do not contain emulsifiers.

This invention also relates to the use of aqueous coating dispersions according to the invention, optionally after addition of initiators for hardening and optionally after dilution with water, but without addition of coalescing agent, for the production of high-gloss chemical-resistant coatings.

Nitrocellulose of all degrees of viscosity, plasticised nitrocellulose or mixtures thereof can be used as cellulose nitrates.

Nitrocellulose, preferably of conventional collodion cotton qualities, that is cellulose nitric acid esters containing a quantity of nitrogen of from 10.2 to 12.4% by weight, are particularly suitable.

Polyepoxide/(meth)acrylates, polyester(meth)acrylates or polyurethane(meth)acrylates are preferably suitable as liquid prepolymer containing from 0.01 to 1.3 mols/100 g of prepolymer, preferably from 0.04 to 1.0 mols/100 g of prepolymer, of polymerisable double bonds.

Polyepoxide compounds containing more than one 1,2-epoxide group per molecule, preferably from 2 to 6, particularly from 2 to 3, 1,2-epoxide groups are preferably used for the production of the polyepoxide(meth)acrylates.

The polyepoxide compounds to be used may be polyglycidyl ethers of polyvalent phenols, for example of pyrocatechine, resorcinol, hydroquinone, 4,4'-dihydroxydiphenylmethane, 4,4'-dihydroxy-3,3'-dimethyldiphenylmethane, 4,4'-dihydroxydiphenyldimethylmethane (bisphenol A), 4,4'-dihydroxydiphenylmethylmethane, 4,4'-dihydroxydiphenylcyclohexane, 4,4'-dihydroxy-3,3'-dimethyldiphenylpropane, 4,4'-dihydroxydiphenyl, 4,4-dihydroxydiphenylsulphone, tris-(4-hydroxyphenyl)methane, of the chlorination and bromination products of the aforementioned diphenols, particularly of bisphenol A; of novolaks (that is of reaction products of mono- or polyvalent phenols with aldehydes, particularly formaldehyde, in the presence of acidic catalysts), of diphenols, which are obtained by esterifying two mols of the sodium salt of an aromatic oxycarboxylic acid with one mol of a dihaloalkane or dihalodialkyl ether (c.f. GB-PS No. 1 017 612), or of polyphenols, which are obtained by condensing phenols and long-chain paraffin halides containing at least two halogen atoms (c.f. GB-PS No. 1 024 288).

Glycidyl ethers of polyhydric alcohols, for example of butane-1,4-diol, glycerin, trimethylol propane, pentaerythritol and polyethylene glycols can also be used. Triglycidyl isocyanurate, N,N'-diepoxypropyloxamide, polyglycidyl thioethers of polyvalent thiols, such as of bismercapto-methylbenzene, and diglycidyl-trimethylene trisulphone are of further interest.

The following can also be used: glycidyl esters of polybasic aromatic, aliphatic and cycloaliphatic carboxylic acids, such as phthalic acid diglycidyl esters, terephthalic acid diglycidyl esters, tetrahydrophthalic acid diglycidyl esters, adipic acid diglycidyl esters, hexahydrophthalic acid diglycidyl esters, which can optionally be substituted by methyl groups and glycidyl esters of reaction products of 1 mol of an aromatic or cycloaliphatic dicarboxylic acid anhydride and ½ mol of a diol or 1/n mol of a polyol having n hydroxyl groups, such as glycidylcarboxylic acid esters corresponding to the following general formula

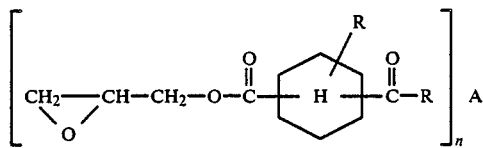

wherein
A represents an at least divalent radical of an aliphatic hydrocarbon which is optionally interrupted by oxygen and/or cycloaliphatic rings, or the divalent radical of a cycloaliphatic hydrocarbon,
R represents hydrogen or alkyl radicals having from 1 to 3 carbon atoms, and
n represents a number between 2 and 6,
or mixtures of glycidyl carboxylic acid esters corresponding to the given general formula (c.f. GB-PS No. 1 220 702).

The production and reaction of the suitable epoxide compounds are disclosed in DOS No. 25 34 012 and DOS No. 26 31 949.

Furthermore, reaction products of oil- and fatty acid-free, optionally unsaturated polyesters with (meth)acrylic acid (=polyester acrylates) can also be used as unsaturated prepolymers.

Those polyesters which can be produced by polycondensing by known processes from alcohols and carboxylic acids as described, for example, in Römpp's Chemielexikon, Vol 1, P. 202, Frank'sche Verlagsbuchhandlung, Stuttgart, 1966 or in D. H. Solomin, The Chemistry of Organic Filmformers, P. 75–101, John Wiley & Sons Inc., New York, 1967 and in H. Wagner and H. F. Sarx, Lackkunstharze, Carl Hanser Verlag, München 1971, P. 96–113, are preferably used as polyesters.

Acid components preferred for the synthesis of the polyesters are aliphatic, cycloaliphatic saturated or unsaturated and/or aromatic polybasic carboxylic acids, preferably di- tri- and tetra-carboxylic acids, having from 2 to 14 preferably from 4 to 12, carbon atoms per molecule or their esterifiable derivatives (such as anhydrides or esters), for example phthalic acid anhydride, isophthalic acid, terephthalic acid, tetrahydro- and hexahydro-phthalic acid anhydride, endomethylene tetrahydrophthalic acid, succinic acid, glutaric acid, sebacic acid, azelaic acid, trimellitic acid and trimellitic acid anhydride, pyromellitic acid anhydride, fumaric acid and maleic acid. Phthalic acid anhydride is the acid component most often used. The polyesters should not contain more than 20 mol%, based on the condensed polycarboxylic acid radicals, of fumaric and maleic acid radicals.

Preferred alcohols for the synthesis of the polyesters are aliphatic, cycloaliphatic and/or araliphatic alcohols having from 1 to 15, preferably from 2 to 6 carbon atoms, and from 1 to 6, preferably from 1 to 4, OH groups bound to non-aromatic carbon atoms per molecule, for example glycols, such as ethylene glycol, propane-1,2-and-1,3-diol, butane-1,2-,-1,3-,and-1,4-diol, 2-ethylpropane-1,3-diol, 2-ethylhexane-1,3 diol, neopentylglycol, 2 2-trimethylpentane-1,3-diol, hexane-1,6-diol, cyclohexane-1,2- and -1,4-diol, 1,2- and 1,4-bis-(hydroxymethyl)-cyclohexane, adipic acid-bis-(ethyleneglycol ester); ether alcohols, such as di- and tri-ethylene glycol, dipropylene glycol; oxalkylated bisphenols having two $C_2$-$C_3$ oxalkyl groups per molecule, perhydrogenated bisphenols; butane-1,2,4-triol, hexane-1,2,6-triol, trimethylol ethane, trimethylol propane, trimethylol hexane, glycerin, pentaerythritol, dipentaerythritol, manitol and sorbitol; chain-terminating monohydric alcohols having from 1 to 8 carbon atoms, such as propanol, butanol, cyclohexanol and benzyl alcohol. The alcohols most often used are glycerin, trimethylol propane, neopentyl glycol and pentaerythritol.

Moreover, condensation products of di- or polyisocyanates, having n-tree isocyanate groups with n mols of hydroxyalkyl-(meth)acrylates are suitable for the production of the dispersions according to the invention. These are produced by reacting aliphatic and/or aromatic polyisocyanates, such as tetramethylene diisocyanate, hexamethylene diisocyanate, isophorone diisocynate, diphenyl methane diisocyanate, toluene diisocyanate, naphthylene diisocyanate, 1,4'-diphenyl ether diisocyanate, optionally dimers or trimers derived therefrom, and their reaction products with subordinate quantities of hydrogen-active compounds, such as polyhydric alcohols, which have been mentioned above, polyfunctional amines and/or aminoalcohols, by reaction with hydroxyl group-containing (meth)acrylic acid esters, such as hydroxy ethyl(meth)acrylate, hydroxypropyl(meth)acrylate and/or butan diol mono(meth)acrylate.

Of the above-mentioned prepolymers, those which contain hydrophilic groups, such as polyether, hydroxyl, sulphate, sulphonate or carboxyl groups, preferably polyesters, as are described in EP-PS No,. 000 337 (corresponding to U.S. Pat. No. 4,281,068), are suitable as prepolymers which are emulsifiable in water in the absence of an emulsifier.

If a plasticiser is also used in the production of the dispersions according to the invention, conventional plasticisers, for example esters of aliphatic monocarboxylic acids, such as cetyl acetate, glycol diacetate, stearates, ricinol acetates, aromatic monocarboxylic acids, such as dioctyl adipte, dimethylcyclohexylmethyl adipate, dibutyl sebacate; aromatic dicarboxylic acids, such as dibutyl phthalate, dioctyl phthalate, dicyclohexyl phthalate, aliphatic tricarboxylic acids, such as tributyl citrate, inorganic acids, such as tributyl phosphate, triphenyl phosphate; and sulphone amides, oils, such as castor oil and linseed oil and the alkoxylation products of the above compounds, such as ethoxylated castor oils and soya oils, stearates, and phosphoric acid esters, can be used.

The ethoxylation products of plasticisers, such as ethoxylated castor oils and soya oils, are mot sutable.

The latter-mentioned plasticisers should not be used in the production of dispersions for coatings on bright bases. If emulsifiers are also used, anionic emulsifiers, such as long-chain alkylaryl sulphonates, such as dodecyl benzene sulphonate or butyl naphthalene sulphonate, sulphono-succinic acid derivatives of ethoxylated alkyl phenols, alkyl sulphates, such as lauryl- or stearyl-alcohol sulphates, sulphosuccinic acid esters, such as dioctyl-disodium succinate, or non-ionic emulsifiers, such as octyl- or nonyl-phenol oxethylates with a degree of oxethylation of suitably from 4 to 100 can optionally be used as emulsifiers. Ethoxylated compounds are preferably used.

An ionic or non-ionic emulsifiers, which may contain small quantities of urea, should, if an emulsifier is also used, be used in the production of dispersions for coatings which are stable under the effects of yellowing All conventional organic solvents with an evaporation number of <20 can be used as solvents for the production of the organic phase.

Acetates, such as ethyl acetate, isopropyl acetate or butyl acetate or ketones, such as acetone or methylisobutyl ketone are preferably used.

The unsaturated prepolymers can be hardened with the use of conventional vinyl polymerisation catalysts or radiation. Conventional free radical-forming catalysts of the peroxide or azo-type are therefore added to the dispersions according to the invention. A catalyst concentration of from 0.1 to 5% by weight, based on the total weight of the vinyl ester material, can be used. Examples of such compounds include: hydrogen peroxide, benzoyl peroxide, lauroyl peroxide, methylethyl ketone peroxide, di-tert.-butylperoxide, tert.-butyl-peroctoate, cumene hydroperoxide and azoisobutyric acid dinitrile. Accelerators, such as dimethylp-toluidine, dimethyl aniline and the like, can be added to the mixture of the vinyl ester resin to further accelerate the hardening of the composition. Polymerisation temperatures of from room temperature to 150° C. should be observed.

Conventional photoinitiators, such as benzophenone, benzildimethyl ketal, benzoin ethers, other aromatic ketones, anthraquinone, thioxanthone or their derivatives, are added in a quantity of from 0 to 20, preferably from 0 to 10% by weight, based on (B) or optionally B+C to radiation-hardenable aqueous coating agent dispersions according to the invention.

Pigments and/or fillers conventionally used in lacquer technology can optionally be added to dispersions according to the invention in quantities of up to 100% by weight, based on the sum of components A-H, rutile, carbon black, talc, zinc oxide, calcium carbonate, various iron oxides or organic pigments being preferred. Furthermore, other auxiliaries conventionally used in lacquer technology, such as wetting agents, anti-foam agents, soluble dyes, can also be used.

The coating agent dispersions are preferably produced. by dissolving or solubilizing together the cellulose material, optionally the plasticisers and optionally one or more emulsifiers and the unsaturated resin, optionally using an organic solvent or solvent mixture, and adding this, preferably dropwise, to the resulting viscous cellulose-containing mixture (paste) followed by water while observing a maximum temperature of 55° C., preferably 45° C.

Depending on the field of application (for example lacquering of wood, metal, syntheticmaterial, paper, leather, glass and films), further known organic slvents with evaporation number 20 can be added to the dispersion, and the solvent concentration of 25%, based on the final lacquer formulation, should not be exceeded.

Aqueous coating agent emulsions produced according to the invention have very good levelling and good stability in storage. They can be processed to produce coatings with high gloss and good yellowing-resistance and excellent chemical-resistance.

EXAMPLE 1

28 g of cellulose nitrate, standard 33 E (in the form of 18 g of dry cellulose nitrate and 10 g of water),
are incorporated into a solution of
5 g of ethoxylated castor oil with a degree of ethoxylation of 80,
37 g of a polyester acrylate with an acid value of <20 and a viscosity of 25 Pa.s at 23° C. (Ebecryl 850 ®), and
7 g of n-butyl acetate, and are dissolved to produce a pasty dispersion.
23 g of water
are incorporated dropwise with the stirring device rotating slowly.

A 60% dispersion is obtained which is stable in storage and contains a proportion of solvent of 7%. (solids: solvent=8.57:1).

The resulting cellulose nitrate dispersion is diluted with water to about 35% by weight, after addition of 1.5% by weight (based on the cellulose nitrate dispersion) of the photoinitiator Darocur ®1173 (Merck Co., Darmstadt) and from about 40 to 50 g/m$^2$ is applied onto a pine wood plate using a spray gun. The wet film is distinguished by very slight sagging and excellent levelling. This surface is then dried for 40 sec at a temperature of 60° C. in a jet drier (air speed: 10 m/sec) and is hardened with UV-radiation at 80 W/cm (1 emitter) and with a belt speed of 10 m/min. This lacquering process is repeated after a grinding process. This results in a dry, high-gloss layer of lacquer which is distinguished by an extremely good surface quality and good resistance to chemicals (stressed for 10 sec with acetone, for example).

EXAMPLE 2

22.0 g of cellulose nitrate, standard 27 E (in the form of 15 g of dry cellulose nitrate and 7 g of water),
are incorporated into a solution of
2.5 g of dibutylphthalate,
3.5 g of ethoxylate castor oil with a degree of ethoxylation of 80, 30.0 g of a polyester acrylate (Roskycal 850 W ®) with an acid value of <18 and a viscosity of 15 Pa.s at 20° C., and 8.0 g of n-butylacetate and dissolved.

34.0 g of water are incorporated dropwise with the stirring device rotating.

A 51% dispersion is obtained which is stable in storage and has a solvent content of 8%. (solids: solvent=6.4:1).

The following lacquer is produced from this dispersion:

Cellulose nitrate dispersion: 70 g
Paraffin emulsion, 10% in water (Fp 57°-60° C.): 10 g
Cobalt acetate (1% in water): 10 g
$H_2O_2$ 30%: 3 g
Water: 7 g.

A 90μ layer of this lacquer is applied to a glass plate and is hardened by means of infra-red drying. A hard layer of lacquer is produced.

EXAMPLE 3

12.6 g of cellulose nitrate, standard 24 E (in the form of 8.2 g of dry cellulose nitrate and 4.4 g of water), are incorporated into a solution of 4 g of ethoxylated castor oil with a degree of ethoxylation of 80, 2 g of dibutyl phthalate, 16.4 g of the polyester acrylate according to Example 2, 16.4 g of a polyester acrylate with an acid value of <5 and a viscosity of 50 Pa.s at 23° C. (Laromer PE 55 F ®), and 5 g of n-butylactate and are dissolved.

43.6 g of water are incorporated dropwise with the stirring device rotating slowly.

A 47% dispersion is obtained which is stable in storage and contains 5% by weight of solvent. (solids: solvent=9.4:1)

This cellulose nitrate dispersion is mixed with 15% by weight of the pigment preparation (Novofil ®, BASF) and 2% by weight (based on the cellulose nitrate dispersion) of a photoinitiator (for example Darocur ®1173-/Merck Co.). This pigmented lacquer is applied to an aluminium foil by means of a doctoring blade (12μ), dried until free of water and then hardened with UV-radiation. A coloured film is obtained which has good gloss, good adhesion and excellent chemical resistance (with respect to ethyacetate, for example).

EXAMPLE 4

25.4 g of cellulose nitrate, standard 33 E (in the form of 17.2 g of dry cellulose nitrate and 9.2 g of water), are incorporated into a solution of 5.0 g of ethoxylated castor oil with a degree of ethoxylation of 100, 3.9 g of dibutylphthalate, and 34.3 g of polyester acrylate (Ebeceryl 810 ®) with an acid vlue of <20 and a viscosity of 0.5 pas at 23° C.

and are dissolved. A pasty dispersion is obtained which is diluted dropwise, with the stirring device rotating slowly, with 30.4 g of water.

A 60.4% dispersion is obtained which is stable in storage and is completely free of solvent.

This dispersion is mixed with 2 g (2% by weight, based on the cellulose nitrate dispersion) of a photoinitiator (Darocur ®1173, Merck Co.) and a layer of 90μ is applied to a glass plate and is dried at 20° C. until free of water. This film of lacquer is subsequently hardened with UV-radiation.

A hard, glossy, transparent layer of lacquer is obtained.

EXAMPLE 5

23.00 Parts by weight of cellulose nitrate, standard 33 E (in the form of 15 g of dry cellulose nitrate and 7 g of water), are incorporated into a solution of 0.03 parts by weight of dodecylbenzene sulphonate, 31.50 parts by weight of a polyester group-containing polyester acrylate (Roskydal 850 W ®, Bayer AG), and 15.00 parts by weight of a polyester acrylate (OTA 480 ®, UCB) with an acid value of ≦1 and a viscosity of 0.07 Pa.s (at 23° C.)

and stirred to produce a pasty dispersion.

30.47 parts by weight of water with 0.10 parts by weight of thickener (Deuteron XG ®, W.O.C Schöner GmbH)

are incorporated dropwise with the stirring device rotating slowly.

A 60% dispersion is obtained which is stable in storage. 2% by weight of photoinitiator (Darocur ®1173, Merck) are stirred into this dispersion which is applied to a white resopal plate using a doctoring blade (120 μm).

This film is stored at room temperature until free of water. It is then hardened with UV-radiation (80 W/cm, 1 emitter, belt speed, 5 m/sec).

The yellowing is assessed after 24 h (c.f. Table 1).

EXAMPLE 6

18.00 parts by weight of cellulose nitrate, standard 32 E (in the form of 12 parts by weight of cellulose nitrate and 6 parts by weight of water), are incorporated into 48.00 parts by weight of a polyether group-containing polyester acrylate (Roskydal 850 W ®, Bayer AG)

and are stirred to produce a pasty dispersion.

34.00 prts by weight of water are added with the stirring device rotating slowly.

A 60% dispersion is obtained which is stable in storage.

2% by weight of photoinitiator (Darodur ®1173 Merck) are stirred into this dispersion which is applied to a white resopal plate using a doctoring blade (120 μm). The lacquer is hardened as in Example 5. Yellowing is assessed fter 24 h (c.f. Table No. 1).

EXAMPLE 7

10 g of a 10% by weight aqueous paraffin emulsion (Mp 57°-60° C.)

10 g of 1% by weight aqueous cobalt acetate solution, 3 g of a 30% by weight $H_2O_2$ solution, and 17 g of water are stirred into 60 g of the 60% by weight dispersion obtained in Example 6.

This lacquer is applied with a coverage of 90 μm to a resopal plate and hardened using infra-red drying. A hard layer of lacquer is obtained which is resistant to yellowing.

TABLE NO. 1

| | Example 1 | Example 2 | Example 3 |
|---|---|---|---|
| Gloss | good | good | good |
| Hardness | good | good | good |
| Yellowing | | no visible yellowing | |

We claim:

1. An aqueous transparent coating dispersion of the oil-in-water type comprising
   A. from 3 to 30% by weight of cellulose nitrate,
   B. from 10 to 50% by weight of at least one liquid prepolymer, which contains from 0.01 to 1.3 mols/100 g of prepolymer of polymerizable C—C-double bonds, said prepolymer containing hydrophilic groups, said hydrophilic group of the prepolymer being selected from the group consisting of polyether, hydroxyl, sulphate, sulphonate, carboxyl and polyester,
   C. at least one liquid prepolymer, which is not emulsifiable in water in the absence of an emulsifier, which contains from 0.01 to 1.3 mols/100 g of prepolymer of polymerizable C—C-double bonds and has a maximum acid value of 25 and a maximum viscosity at 23° C. of 60 Pa.s, said liquid prepolymer contained in an amount of up to 25% by weight,
   D. from 0 to 20% by weight of an organic solvent with an evaporation number of <20,
   E. from 0 to 15% by weight of a plasticiser,
   F. from 0 to 5% by weight of an emulsifier,
   G. from 0 to 10% by weight of additives, and
   H. water as the remainder,
   the total of A to H always being 100% by weight and if B=C, the quantity of the emulsifier is >0.

2. An aqueous dispersion according to claim 1, wherein B is a prepolymer which is emulsifiable in water in the absence of an emulsifier.

3. An aqueous dispersion as claimed in claim 1, wherein the prepolymers contain from 0.04 to 1.0 mols/100 g of prepolymers of polymerisable double bonds.

4. An aqueous dispersion as claimed in claim 1, wherein the prepolymer is selected from the group consisting of polyepoxide/(meth)acrylates, polyester(-meth)acrylates and polymethane(meth)acrylate.

5. An aqueous dispersion as claimed in claim 1, wherein the plasticizer is selected from the group consisting of esters of aliphatic monocarboxylic acids, aromatic monocarboxylic acids, aromatic dicarboxylic acids, aliphatic tricaroboxylic acids, inorganic acids, sulphone amides, oils and the alkoxylation products of the above plasticizers.

6. An aqueous dispersion as claimed in claim 1, wherein the emulsifier is selected from the group consisting of long-chain alkylaryl sulphonates, sulphor-succinic acid derivatives of ethoxylated alkyl phenols, alkyl sulphates, sulphosuccinic acid esters, octyl-phenol oxethylates with a degree of oxethylation of 4 to 100, and nonyl-phenol oxethylates with a degree of oxethylation of 4 to 100.

7. An aqueous transparent dispersion of the oil-in-water type resistant to yellowing consisting essentially of
   A. from 3 to 30% by weight of cellulose nitrate,
   B. from 10 to 50% by weight of at least one liquid prepolymer which contains from 0.01 to 1.3 mols/100 g of prepolymer of polymerizable C—C-double bonds, said prepolymer containing hydrophilic groups, said hydrophilic group of the prepolymer being selected from the group consisting of polyether, hydroxyl, sulphate, sulphonate, carboxyl and polyester,
   C. at least one liquid prepolymer, which is not emulsifiable in water in the absence of an emulsifier, which contains from 0.01 to 1.3 mols/100 g of prepolymer of polymerizable C—C-double bonds and has a maximum acid value of 25 and a maximum viscosity at 23° C. of 60 Pa.s, said liquid prepolymer contained in an amount of up to 25% by weight,
   D. from 0 to 20% by weight of an organic solvent with an evaporation number of <20,
   E. from 0 to 15% by weight of additives and
   F. water as the remainder,
   the total of A to F always being 100% by weight and if B=C, the quantity of the emulsifier is >0.

8. High-gloss coatings produced from dispersions as claimed in claim 1.

9. An aqueous coating dispersion according to claim 1, wherein prepolymer B has a molecular weight of 300 to 5000.

10. An aqueous coating dispersion according to claim 1, wherein prepolymer B has a molecular weight of 500 to 2000.

11. An aqueous transparent dispersion of the oil-in-water type consisting essentially of
    A. from 3 to 30% by weight of cellulose nitrate,
    B. from 10 to 50% by weight of at least one liquid prepolymer which contains from 0.01 to 1.3 mols/100 g of prepolymer of polymerizable C—C-double bonds, said prepolymer containing hydrophilic groups, said hydrophilic group of the prepolymer being selected from the group consisting of polyether, hydroxyl, sulphate, sulphonate, carboxyl and polyester,
    C. from 0 to 20% by weight of an organic solvent with an evaporation number of <20,
    D. from 0 to 15% by weight of a plasticiser,
    E. from 0 to 5% by weight of an emulsifier and
    F. water as the remainder,
    the total of A to F always being 100% by weight and if B=C, the quantity of the emulsifier is >0.

12. An aqueous dispersion as claimed in claim 9 further consisting essentially of an anionic or nonionic emulsifier.

* * * * *

UNITED STATES PATENT AND TRADEMARK OFFICE
CERTIFICATE OF CORRECTION

PATENT NO. : 4,772,329
DATED : Sep. 20, 1988
INVENTOR(S) : Lühmann et al.

It is certified that error appears in the above-identified patent and that said Letters Patent is hereby corrected as shown below:

Col. 5, Line 17    Delete "mot sutable" and substitute --most suitable--
Col. 6, Line 17    Correct spelling of --solvents--
Col. 7, Line 35    Correct spelling of --butylacetate--
Col. 7, Line 62    Correct spelling of --value--
Col. 8, Line 11    Correct spelling of --parts--
Col. 8, Line 20    Delete "$" and substitute --¢-- after "of"
Col. 8, Line 47    Correct spelling of --parts--
Col. 8, Line 55    Correct spelling of --after--

Signed and Sealed this

Thirteenth Day of June, 1989

Attest:

DONALD J. QUIGG

*Attesting Officer*    *Commissioner of Patents and Trademarks*